Patented Aug. 10, 1937

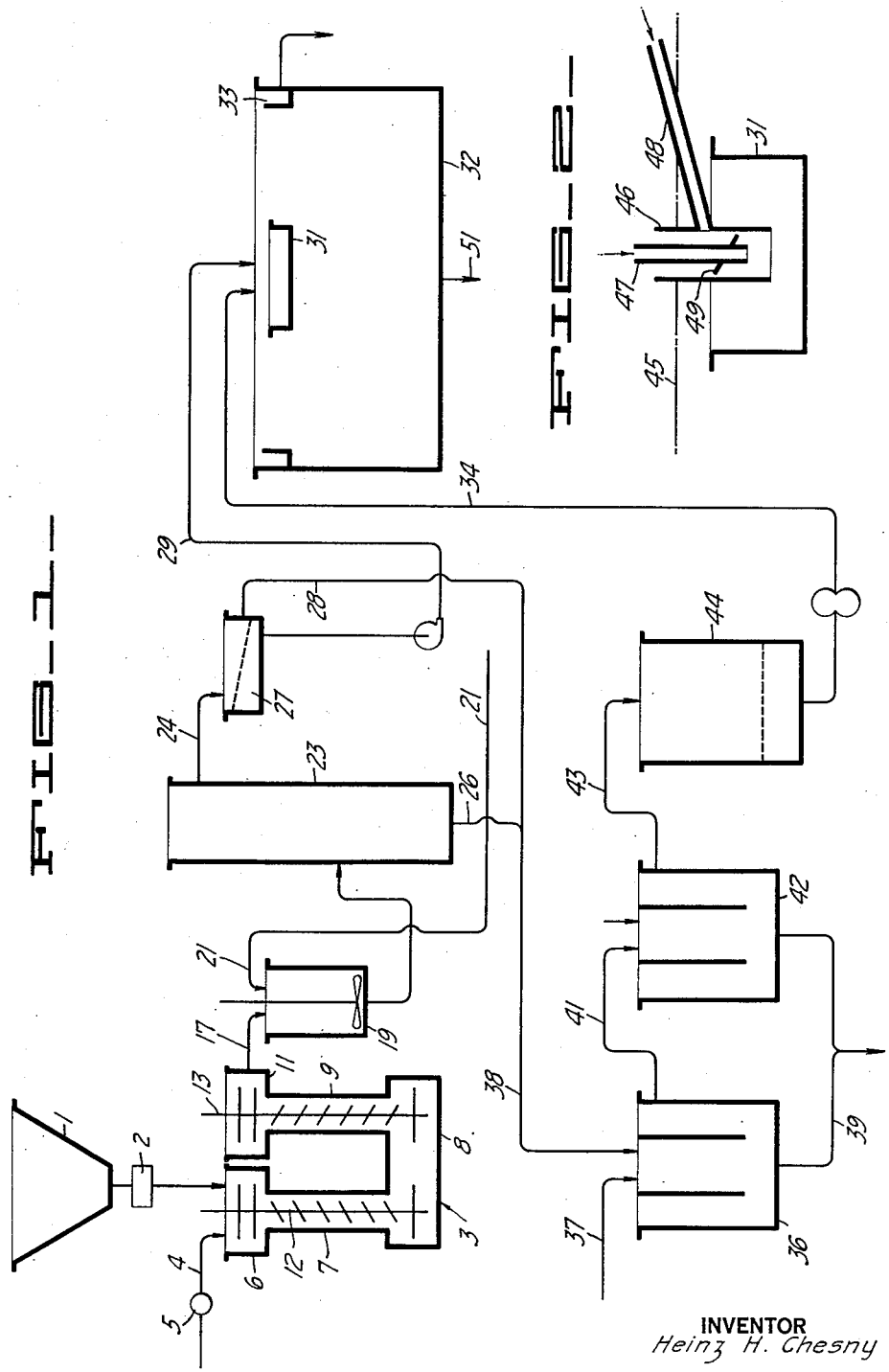

2,089,339

UNITED STATES PATENT OFFICE 2,089,339

METHOD OF MANUFACTURING MAGNESIUM HYDROXIDE

Heinz H. Chesny, San Mateo, Calif., assignor to Marine Chemicals Company, Ltd., San Francisco, Calif., a corporation of Delaware Application January 31, 1934, Serial No. 709,159

7 Claims. (Cl. 23—201)

This invention relates generally to the manufacture of magnesium products from brines containing convertible magnesium salts.

In the manufacture of various magnesium products it has been common to utilize the reaction of an alkali, such as caustic soda or lime, with a brine containing convertible magnesium salts, particularly the chloride and the sulphate. As a result of such reaction, magnesium hydroxide is precipitated, and must then be removed from the mother liquor. The ease with which the precipitate can be removed from the mother liquor is dependent largely upon the settling rate of the precipitate in the brine solution. If a relatively slow settling rate is afforded, it is evident that separation of the magnesium hydroxide will be extremely difficult, and that any process possessing such characteristics will be commercially impractical if not entirely inoperative.

In one process which has been developed commercially, the brine is reacted with an alkali, such as lime, in such a manner as to produce magnesium hydroxide particles of a crystalline nature having negligible if any water of hydration. Such particles have a settling rate in the brine sufficient to enable ready separation and subsequent treatment. While such a process is commercially feasible and operable, it has the disadvantage that the physical and chemical activity of the resulting precipitate, or of other magnesium products made from the same, is not as great as is frequently desired. Likewise, a suspension or slurry formed of such particles possesses relatively low viscosity, and tends to settle out rapidly.

When a brine is reacted by lime or other alkali in free solution, the reaction proceeds rapidly to precipitate a form of magnesium hydroxide which is hydrated to varying degrees, depending upon additional factors affecting the reaction. Such a precipitate is characterized by relatively high solubility, low density, high chemical and physical activity, and relatively high viscosity when in the form of a slurry. However, unless produced by a particular method such as disclosed herein, it has a low settling rate (e. g. a few inches per hour), thus making its separation from the mother liquor uneconomical and commercially impractical.

It is an object of the present invention to provide a commercially practical method for the manufacture of magnesium products having relatively high chemical and physical activity, from brines containing convertible magnesium salts.

A further object of the invention is to provide a method for the manufacture of a hydrous form of magnesium hydroxide which will enable rapid separation of the precipitate from the brine solution.

A further object of the invention is to provide a method of the above-described character having novel provision for minimizing contamination of the final product with certain impurities, such as calcium.

Another object of the invention is to provide a method of the above character which will be particularly effective with relatively dilute brines, such as ocean water.

Referring to the drawing:

Fig. 1 is a flow sheet illustrating a system or arrangement of apparatus for carrying out the present invention.

Fig. 2 is a detail, in cross-section, showing suitable means for reacting milk of lime with brine, in accordance with my method.

In order to make possible the commercial production of magnesium hydroxide possessing the properties which I desire, the present invention is characterized by the precipitation of agglomerates or agglomerated flocks of hydrated magnesium hydroxide particles. The agglomerates may measure from $\frac{1}{32}$ to $\frac{1}{4}$ of an inch in diameter, while the bulk of the single particles which make up the agglomerates measure from about 0.5 to 1.5 microns in diameter. By the formation of such agglomerates it is possible to effect a settling of the solids in the mother liquor at a rate of five feet per hour, and as high as one hundred feet per hour, while maintaining the individual particles making up the agglomerates in a state of physical fineness. When such agglomerates reach the zone of concentration in the settling chamber, they lose their individual identities to form a uniform mass of extremely small hydrated particles of magnesium hydroxide having properties such as will be presently described.

To enable a better understanding of certain features of my method, it may be explained that magnesium hydroxide precipitated in accordance with the present method possesses the property of forming hydrates containing an unknown number of molecules of water of hydration. I have found that the more highly hydrated magnesium hydroxide is more active, in both chemical and physical reactions, than material associated with a smaller or negligible quantity of water of hydration. The water of hydration may be thought of as surrounding the individual particles in such a manner that the molecular layer of water immediately adjacent to the particles is held more strongly, due to the greater affinity of the magnesium hydroxide toward water at that point. Successive layers of water of hydration are held successively more loosely, so that there is a gradual decrease in the affinity with increasing distance from the magnesium hydroxide molecules, until at a certain distance this affinity ceases altogether and the water at that point is in the free flowing state.

The present invention is predicated in part upon the discovery that a reaction can be carried out between two compounds, each present as solute in separate liquid phase, so that the reaction is confined to contacting interfaces or planes of cleavage between the two liquids, or, in other words so that the reaction takes place mainly in two, rather than three, dimensions. In this connection it may be noted that only dissolved substances enter into reaction; as a consequence the presence of solid phase material (such as undissolved lime) may be disregarded as having no bearing upon the reaction, other than to supply, due to its dissolution, additional substance to the liquid phase. The carrying out of a reaction in this manner is dependent largely upon the manner in which the two solutions are agitated or commingled at the interface of reaction. The significance of this discovery is that it has been found possible by its application, to precipitate magnesium hydroxide having a relatively high quantity of water of hydration, and at the same time to form agglomerated flocks from a group of such particles, having a relatively high settling rate.

In general, the method of the present invention is carried out as follows: The brine containing convertible magnesium salts, which may be ocean water, mineral spring water, salt brine, artificial brines produced by dilution or dissolution of concentrates bearing soluble magnesium salts, or the like, is treated to remove impurities. To prepare a suitable precipitating agent, burnt lime is first slaked with fresh water to produce a relatively concentrated slurry. This slurry is then diluted, preferably with brine from which magnesium hydroxide has been previously precipitated. As the result of such dilution, additional lime goes into free solution until the OH ion concentration reaches saturation at about 1.2 gms (at 20° C.) of CaO per liter of water in free solution. The solid phase lime remaining in the slurry goes into free solution at the time of the main reaction, as will be presently explained.

The diluted lime slurry produced as explained above is then preferably subjected to purifying treatment to remove certain materials which might otherwise cause contamination of the precipitated magnesium hydroxide. Thus, I subject the slurry to hydraulic classification to remove such impurities as unreacted calcium oxide, calcium silicate, calcium sulphate, siliceous matter, etc. I also pass the slurry through a suitable screen, since I have found that by such treatment most of the relatively coarse calcium carbonate can be removed, together with other coarse solid material which may not have been removed by hydraulic classification. Preferably, both hydraulic classification and screening are employed, although either one of these steps can be employed without the other.

As has been previously explained, purification of the lime slurry is for the purpose of minimizing contamination of the desired magnesium hydroxide. Therefore, it is evident that its application can be omitted or modified in accordance with the permissible contamination of the magnesium hydroxide to be obtained. Hydraulic classification can best be carried out upon diluted slurry, and therefore it has been described as taking place after dilution of the initial mix. However, if desired, the initial slaked mix can first be diluted to a point where hydraulic classification and screening can take place. Following classification and screening, the slurry can then be further diluted to secure the final milk of lime.

The milk of lime produced as above is then introduced into the bulk of the brine, with gentle agitation to properly commingle the two liquids and under controlled conditions with respect to the rate of flow, to cause the formation of agglomerated flocks of highly hydrated magnesium hydroxide. These flocks are then caused to flow from the mixing and reacting zone into the body of a settling tank, where concentration of the magnesium hydroxide takes place and from which the mother liquor is removed.

A representative form of the process can be described in greater detail by reference to the equipment illustrated diagrammatically in the drawing. Bin 1 represents a source of burnt lime or calcium oxide, which can be supplied by a feeder 2 to the slaking apparatus 3. Line 4 represents the introduction of fresh water to slake the lime, the quantity of water added being indicated by meter 5. Suitable proportions for the slaking operation are from two to three parts by weight of water to one part of lime. During slaking of the lime care should be taken to avoid growth of large calcium hydroxide crystals, which of necessity must be removed in preparing the final milk of lime, with resulting wastage. Thus, apparatus 3 consists of a preliminary mixing tank 6, connected by conduit 7 to a retention tank 8. Retention tank 8 is in turn connected by conduit 9 to a final mixing tank 11. Rotary agitators 12 and 13 are provided, having flights arranged to cause downward movement through conduit 7 to the retention tank 8, and upward movement of the slurry from the retention tank to tank 11. As an example of suitable practice, slurry remains in tank 6 for only about five minutes, which is insufficient time to permit growth of crystals by virtue of the seeding action of fresh lime. No growth of crystals occurs in tanks 8 and 11, because the slurry retained therein is not in contact with fresh lime. The total period of retention in tanks 8 and 11 together with conduits 7 and 9, may be about 38 minutes, during which period slaking of the lime is completed. It should be noted in this connection that the period of retention to secure proper slaking will depend upon the character of lime employed. The specific data mentioned refers particularly to the use of a high grade rapidly slaking lime.

From tank 3 the slaked lime slurry flows to a mixing tank 19, provided with a suitable mechanical agitator, where the slurry is mixed and diluted with water introduced by way of line 21. In place of using fresh water for dilution, I prefer to employ brine from which magnesium salts have been precipitated. While the amount of brine added may vary in accordance with different requirements or operating conditions, good results have been produced by using such proportions that the mixture contains approximately 0.3 to 0.5 pound of calcium oxide per gallon of slurry.

The slurry removed from the mixing tank 19, which may be termed "primary slurry", is then introduced into a tower 23 which functions as a hydraulic classifier. By virtue of the hydraulic classification taking place within the tower, heavier solids of the slurry, comprising chiefly calcium carbonate, silicate and sulphate, settle to the bottom of the tower, while that portion of the slurry containing the finer particles of calcium hydroxide together with finely divided and hydrated particles of magnesium hydroxide, is carried upwardly for removal as indicated by line 24. The heavier solids settling to the bottom of tower 23 constitute what can be termed a sludge, and are shown being removed by way of line 26.

The slurry removed by way of line 24 is preferably further treated by a screening operation, to remove coarser impurities which may be present, particularly calcium carbonate, and which cannot readily be removed by hydraulic classification. Therefore, this slurry is shown being delivered to a screening device 27 which may be an oscillatory or shaking screen covered with bolting cloth or wire screen of suitable mesh. Good results have been secured by using a screen having openings of from 0.002 to 0.005 inch in diameter. The rejected coarser material from screen 27 is shown being removed by way of line 28 and merged with reject sludge from the tower 23. The purified slurry from the screening device 27 is shown being delivered by line 29 to the mixing and reacting chamber 31, and consists of undissolved calcium hydroxide, together with a considerable amount of calcium hydroxide in free solution, and dispersed hydrated particles of magnesium hydroxide. Chamber 31 is disposed within a settling vat 32 of suitable dimensions, provided with an overflow launder 33. The bulk of the brine containing convertible magnesium salts is also delivered to the chamber 31, by way of line 34. Assuming that the slaked lime in bin 19 is to be diluted with brine from which convertible magnesium salts have been substantially removed, a portion of the overflow from launder 33 can be diverted by way of line 21, for this purpose.

Chiefly for purposes of economy, it is desirable to utilize the rejects from tower 23 and screening device 27, to effect a pretreatment of the bulk of the brine. Thus, the raw brine is shown being delivered to a tank 36, by line 37. Into this tank there is also introduced the combined sludge formed by the rejects from lines 27 and 28, as indicated by line 38. The amount of sludge introduced is of course properly proportioned, so that the calcium hydroxide of the sludge precipitates certain impurities in the raw brine, such as calcium bicarbonate which is precipitated as calcium carbonate. The precipitated impurities are shown being removed by line 39, while the treated brine is shown being removed by line 41 and delivered to the retention tank 42. While in the retention tank 42 the brine may or may not be further treated by suitable chemicals, as for example alum, to cause flocculation of further impurities, and the brine is then passed by line 43 to the filter 44. The clarified brine from the filter 44 is then delivered through line 34 to the mixing compartment 31.

In Fig. 2 there is shown a suitable means for causing proper admixture and flow of the brine with respect to the reacting slurry at the time these two liquids are brought into contact and flowed into the mixing chamber 31. The mixing chamber 31 in this instance is in the form of an open-topped box, either square or cylindrical in contour, and having its upper edge submerged below the normal level 45 of liquid in the vat 32. An open-ended tube 46 extends down into the chamber 31, with its upper end above the water level 45 and its lower end intermediate the bottom of the chamber 31 and the upper rim of the same. Lime slurry or milk of lime, produced as previously described, is discharged into the lower portion of tube 46 through pipe 47. Brine is introduced into tube 46 through pipe 48 which communicates with tube 46 at a point intermediate the water level 45 and the lower open end of pipe 47. Within the tube 46 there is a baffle 49 which serves to deflect the flow of brine from pipe 48, thus securing a relatively even downward flow from the lower end of tube 46. The flow from the lower end of tube 46 moves outwardly above the floor of chamber 31, then upwardly, and finally outwardly over the upper edge of the chamber 31 into the main body of liquid in vat 32. Pipe 47 can be made adjustable so as to permit an adjustment of the height of its lower end with respect to tube 46, in order to obtain proper mixing of the lime slurry with the brine.

Within the compartment 31 there is largely a concurrent flow of brine and milk of lime, with only sufficient agitation to effect substantially complete reaction by commingling, whereby the reaction occurs mainly between the contacting interfaces of the brine and the liquid phase lime. The degree of agitation obtained can of course be adjusted to suit requirements, to give the results desired. In general, with the arrangement illustrated in Fig. 2, the amount of agitation will depend somewhat upon the rate of flow of each of the liquids into the tube 46, upon the relative rate of flow between them, and upon the proportioning of the parts and the construction and angular setting of baffle 49. In an installation which I have operated upon ocean water, I have found that the discharge velocity of the reaction mixture from the lower end of tube 46 preferably should not be greater than twelve feet per minute, and that best results are secured by a velocity of about eight feet per minute. In the same installation the discharge velocity of the milk of lime from pipe 47 was about ten times the discharge velocity of the mixture from the lower end of tube 46.

Assuming that the reaction is carried out under controlled conditions, as has been explained above in connection with Fig. 2, the reaction between the milk of lime and the brine is substantially completed within the chamber 31, and relatively large agglomerated flocks of magnesium hydroxide are formed, which flow outwardly over the upper rim of chamber 31 and settle rapidly to the bottom of tank 32. Generally, the settling rate is at least from three to five feet per hour, and it may be as great as one hundred feet per hour. From the vat the precipitated magnesium hydroxide can be removed as indicated by line 51.

From the explanation of the invention which has been previously made, it will be understood that if too great an amount of agitation takes place at the time the brine is contacted with the milk of lime, agglomerated flocks of magnesium hydroxide will not be formed or will be broken up immediately, and the individually dissociated small particles of magnesium hydroxide delivered into the main portion of the brine in vat 32 will have a relatively slow settling rate. Therefore, agitation at the time of contact should be sufficient only to secure complete reaction, without, however, being sufficiently intense to prevent the formation of the desired agglomerated flocks. It is evident that other forms of apparatus can be employed to secure proper controlled conditions at the time of reaction, in place of the apparatus illustrated in Fig. 2.

With respect to the amount of milk of lime which is reacted with the main body of the brine, it may be explained that best results are secured when the proportioning is such as to obtain substantially 100% theoretical complete conversion of the convertible magnesium salts. In general, as the amount of lime increases towards the amount required for theoretical 100% complete conversion, the viscosity of the slurry and the desired state of hydration of the precipitate tend to increase. Since the milk of lime which I prefer to employ has previously been purified, such quantities (or even a slight excess) can be employed to secure theoretical 100% conversion without causing detrimental calcium contamination of the resulting precipitate.

At the time of the reaction with the main bulk of the brine, as has been previously explained, the flocks in their formation tend to include the solid phase calcium hydroxide, and the lime of these particles enters into free solution to continue the reaction to completion with accompanying growth of the flocks. This action is to be distinguished from direct introduction of dry calcium hydrate to the brine, in which event the precipitated particles have little if any water of hydation, due presumably, to a retardation of the reaction. In the present invention the inclusion of solid phase lime in the flocks may retard the time required for completing the reaction, but such retardation is relatively slight compared to that involved when particles of dry calcium are directly introduced into the brine.

As previously stated, I prefer to dilute the heavy lime slurry with brine from which magnesium salts have been precipitated. This is for the reason that the use of such brine tends to increase the settling rate of the agglomerated flocks. However, fresh water and even unreacted brine have been employed. Unreacted brine has been found to afford a less desirable form of precipitate, particularly with respect to the degree of hydration.

The complete method or process which has been outlined above with reference to Fig. 1 may be carried out continuously or intermittently; or certain steps in the operation may be carried out continuously and other steps intermittently. Likewise, while the particular steps which have been outlined for the production of a suitable milk of lime or lime slurry are desirable and have given good results, it is evident that these steps may be modified in accordance with particular plant installations, the character of the brine employed, the character of lime available, or the purity of the magnesium hydroxide desired. Ordinarily, purification of the reaction milk of lime is desirable because it facilitates the production of a magnesium hydroxide relatively free of lime contamination.

The magnesium hydroxide which is produced by my process has many desirable characteristics, as have been previously set forth. More specifically, in practice I have produced a magnesium hydroxide suspension (in water) in accordance with the present method, which has a viscosity of about 1.2 to 1.8 times that of water where the suspension contains 5% solids. While the viscosity of such a suspension may involve various factors, it is my observation that an increase in viscosity is an index of increased hydration. Due to the fine state of subdivision and to the quantity of water of hydration retained by the particles when in suspension, the material has relatively high chemical and physical activity.

While my method has been described as applicable to a variety of brines, it has been found of particular value when utilizing ocean water or like dilute brines, where a relatively large bulk of liquor must be handled for the production of a given amount of magnesium hydroxide. The particular embodiment of the invention and the specific data specified, are with respect to brines of this charatcer.

I claim:

1. In a method of manufacturing magnesium products from brines containing convertible magnesium salts, continuously mixing calcium oxide with water to form a slurry, promptly removing the slurry from contact with fresh calcium oxide to inhibit growth of calcium hydroxide crystals during slaking, substantially completing the slaking to form a milk of lime, screening the milk of lime to remove impurities like calcium carbonate therefrom, and then contacting the milk of lime with brine from which magnesium hydroxide is to be precipitated.

2. In a method of manufacturing magnesium products from brines containing convertible magnesium salts, continuously mixing calcium oxide with water to form a relatively concentrated slurry, promptly removing the slurry from contact with fresh calcium oxide to inhibit substantial growth of calcium hydroxide crystals during slaking, substantially completing the slaking and diluting the slurry with water to form a milk of lime, screening the milk of lime to remove calcium carbonate therefrom, and then contacting the milk of lime with the main bulk of the brine from which magnesium hydroxide is to be precipitated.

3. In a method for the manufacture of magnesium products from brine containing convertible magnesium salts, causing a stream of milk of lime to be delivered concurrently into a stream of the brine, with a differential velocity between the streams to afford a commingling with reaction between the interfaces of the brine and the lime solution to cause formation and maintenance of agglomerated flocks of hydrous magnesium hydroxide, and immediately thereafter decreasing the velocity of flow of the combined stream and causing the same to flow laterally into a body of mother liquor, below the surface of the same.

4. In a method for the manufacture of magnesium products from brine containing convertible magnesium salts, maintaining a body of substantially quiescent mother liquor, supplying streams of brine and unclarified milk of lime to a localized reaction zone in the upper portion of said body beneath the surface of the same, causing the brine and the milk of lime to flow into said zone with a differential velocity to afford a commingling with reaction between interfaces of the brine and the milk of lime, to cause formation and maintenance of agglomerated flocks of magnesium hydroxide, and then causing the reaction mixture to spread laterally with decreasing velocity from said zone into the mother liquor.

5. A method for the manufacture of magnesium products from brine containing convertible magnesium salts, which comprises, establishing flow streams of brine and unclarified milk of lime, delivering said streams to a reaction chamber, contacting said streams in said reaction chamber with sufficient agitation to cause reaction between the brine and milk of lime and formation of agglomerated flocks of magnesium hydroxide, but with insufficient agitation to break up said flocks when formed, said contacting comprising commingling said streams to form a combined stream and then decreasing the velocity of said combined stream within the reaction chamber to reduce the amount of agitation and thereafter without increasing the agitation discharging said combined stream from said reaction chamber laterally into a quiescent body of mother liquor below the surface thereof.

6. A method for the manufacture of magnesium products from brine containing convertible magnesium salts, which comprises, establishing flow streams of brine and unclarified milk of lime, delivering said streams to a reaction chamber, contacting said streams in said reaction chamber with sufficient agitation to cause reaction between the brine and milk of lime and formation of agglomerated flocks of magnesium hydroxide, but with insufficient agitation to break up said flocks when formed, said contacting comprising commingling said streams by discharging the streams into said reaction chamber in concentric relation and with differential velocities to form a combined stream and then decreasing the velocity of said combined stream within the reaction chamber to reduce the amount of agitation and thereafter without increasing the agitation discharging said combined stream from said reaction chamber laterally into a quiescent body of mother liquor below the surface thereof.

7. A method for the manufacture of magnesium products from brine containing convertible magnesium salts, which comprises, establishing flow streams of brine and unclarified milk of lime, delivering said streams to a reaction chamber positioned below the surface of a quiescent body of mother liquor in a settling tank, contacting said streams in said reaction chamber with sufficient agitation to cause reaction between the brine and milk of lime and formation of agglomerated flocks of magnesium hydroxide, but with insufficient agitation to break up said flocks when formed, said contacting comprising commingling said streams to form a combined stream and then decreasing the velocity of said combined stream within the reaction chamber to reduce the amount of agitation and thereafter without increasing the agitation discharging said combined stream from said reaction chamber laterally into said body of mother liquor below the surface thereof.

HEINZ H. CHESNY.